C. BADEN.
MODE OF DIMINISHING FRICTION.
No. 49,685. Patented Aug. 29, 1865.
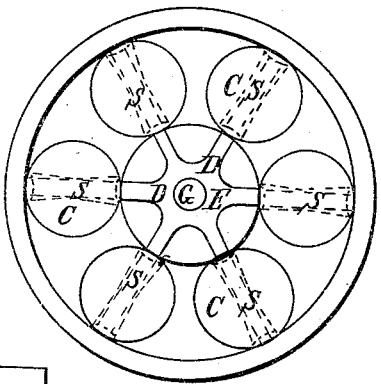
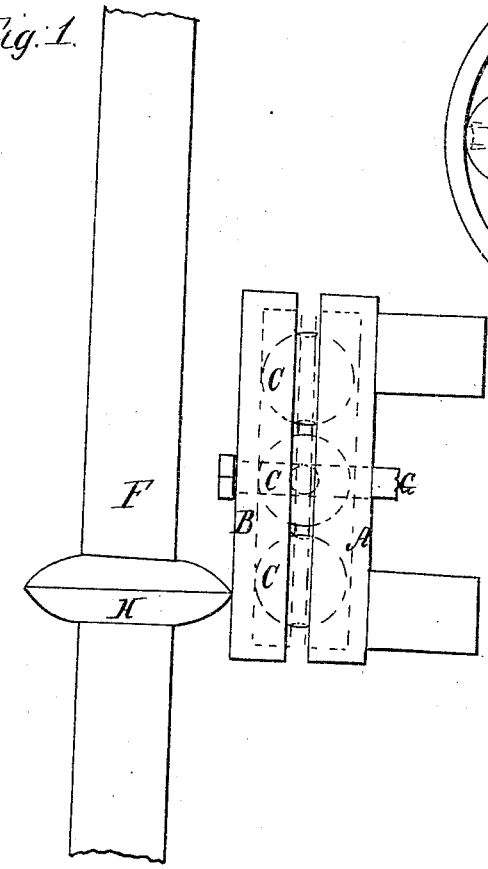

UNITED STATES PATENT OFFICE.

CHARLES BADIN, OF PARIS, FRANCE.

IMPROVED MODE OF DIMINISHING FRICTION.

Specification forming part of Letters Patent No. 49,685, dated August 29, 1865.

*To all whom it may concern:*

Be it known that I, CHARLES BADIN, of Paris, France, have invented a new and Improved Mode of Diminishing Friction upon Axles, Journals, or other Organs of Rotation; and I do hereby declare that the following is a full and exact description thereof, reference being had to the accompanying drawings, and to the letters of reference marked thereon.

The nature of my invention consists in resting the axle-tree, the journal, or other organ of which it is desirable to diminish the friction, upon a sort of rotating plate, by means of a collar either forming part of the axle or attached thereto, as seen at H in Figure 1 on the axle or journal F.

The rotating plate is shown at B, in Fig. 1, resting on the fixed plate or bottom A, and revolving thereon by means of the steel balls C C C. The distances between these balls are maintained by the radii D D D, Fig. 2, which are fixed upon the crown E and keyed upon the central axle, G. These radii D D D pass freely through the balls C C C, which for that purpose are pierced in such manner that the diameter of the hole is greater than that of the radii, thus leaving to the said balls all the mobility necessary to their intended function. Finally, upon the movable plate B, I rest the tree or stem F, by means of the collar H, taking care that the point of contact of this collar shall be between the center of the balls and the axis of rotation. The grooves in the plates in which the balls work must be deep enough to keep the plates steady, so that in their rotation they shall not rub against their axes. The balls, which may be made of any suitable material, must be perforated, so that the opening widens itself, as shown in the drawings at s s s s, Fig. 2, from the center to the circumference, in such manner that there may be but one tangent-point between the axes of the ball and the ball itself. The opening at the narrowest part must admit an easy play of the axis, which is not designed to support any pressure, but merely to maintain the proper distance between the balls. The movement of rotation is communicated to the balls by the movable platform, which itself receives its motion from the collar, and sustains the whole weight or pressure of the machine and its load.

The apparatus in its application must be protected from dust, and must be greased only at the points destined to regulate the lateral movements of the axles; and the component parts must always be made as large as circumstances will admit. It is applicable to vehicles of all kinds with any number of wheels; to locomotives and steam machinery of all kinds; to axles of transmission, hydraulic engines, windmills, agricultural machines, sewing-machines, pulleys, and every other mechanical device where it is important to diminish friction.

I do not claim the application of balls for the diminution of friction, for these have been used before; but

What I claim as my invention, and desire to secure by Letters Patent, is—

1. The combination of the collar H on the axle with the movable plate B, supported by the perforated balls C C C, revolving upon a fixed plate, A, and held to their places by the arms D D, all arranged in the manner and for the purposes above described.

2. The mode of piercing the said balls so that the arms D D D shall have only one point of contact therewith, in the manner and for the purpose above described.

In testimony whereof I have signed my name to this specification before two subscribing witnesses.

CHARLES BADIN.

Witnesses:
JAMES CRUTCHETT,
E. WELLS.